United States Patent
Drew et al.

(10) Patent No.: US 6,746,083 B2
(45) Date of Patent: Jun. 8, 2004

(54) VEHICLE SEAT ASSEMBLY

(75) Inventors: Dale Michael Drew, Grosse Pte. Farms, MI (US); Eric Anthony Woods, Allen Park, MI (US); Mark Allyn Folkert, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/259,266

(22) Filed: Sep. 27, 2002

(65) Prior Publication Data

US 2004/0061370 A1 Apr. 1, 2004

(51) Int. Cl.[7] .................................................. B60N 2/36
(52) U.S. Cl. .................... 297/378.12; 297/15; 297/331; 297/335; 296/65.05; 296/65.09; 296/66
(58) Field of Search ............................ 297/15, 378.12, 297/378.1, 331, 335; 296/65.09, 65.05, 66, 69

(56) References Cited

U.S. PATENT DOCUMENTS

| 5,195,795 | A | | 3/1993 | Cannera et al. ......... 297/331 X |
|---|---|---|---|---|
| 5,702,145 | A | * | 12/1997 | Fowler et al. ................. 296/66 |
| 5,890,758 | A | | 4/1999 | Pone et al. .................... 297/15 |
| 5,934,732 | A | | 8/1999 | Jakubiec ................. 297/331 X |
| 5,975,612 | A | | 11/1999 | Macey et al. ........ 296/65.05 X |
| 5,979,964 | A | * | 11/1999 | Ban et al. .................. 297/15 X |
| 6,106,046 | A | | 8/2000 | Reichel ..................... 297/15 X |
| 6,113,187 | A | * | 9/2000 | Sugiyama et al. ........ 297/15 X |
| 6,123,380 | A | | 9/2000 | Sturt et al. ................. 297/15 X |
| 6,179,362 | B1 | | 1/2001 | Wisniewski et al. ..... 297/378.1 |
| 6,199,951 | B1 | | 3/2001 | Zeile et al. ............ 297/378.12 |
| 6,279,982 | B1 | | 8/2001 | Nishimura et al. ....... 297/15 X |
| 6,406,084 | B1 | * | 6/2002 | de Campos et al. .. 296/65.09 X |
| 6,536,843 | B1 | * | 3/2003 | Severinski et al. ........ 297/15 X |
| 2001/0001526 | A1 | | 5/2001 | Moon et al. ......... 296/65.09 X |
| 2002/0033623 | A1 | * | 3/2002 | Sunohara ..................... 297/331 |
| 2002/0067056 | A1 | * | 6/2002 | Garrido et al. ............... 297/15 |
| 2002/0190545 | A1 | * | 12/2002 | Kumer, Jr. ................... 297/15 |

* cited by examiner

Primary Examiner—Peter M. Cuomo
Assistant Examiner—Rodney B. White
(74) Attorney, Agent, or Firm—Bill C. Panagos

(57) ABSTRACT

A vehicle seat assembly for mounting on a vehicle floor including a seat bottom pivotally mounted relative to the vehicle floor. The seat bottom defines an upper surface and an opposed lower surface. The seat bottom is movable between a seating position, wherein the upper surface faces upwards, and a storage position, wherein the lower surface faces upwards. A panel is pivotally connected to the seat bottom. The panel is automatically moved between a first position underneath the seat bottom when the seat bottom is in the seating position, and a generally horizontally deployed position when the seat bottom is moved to the storage position.

20 Claims, 4 Drawing Sheets

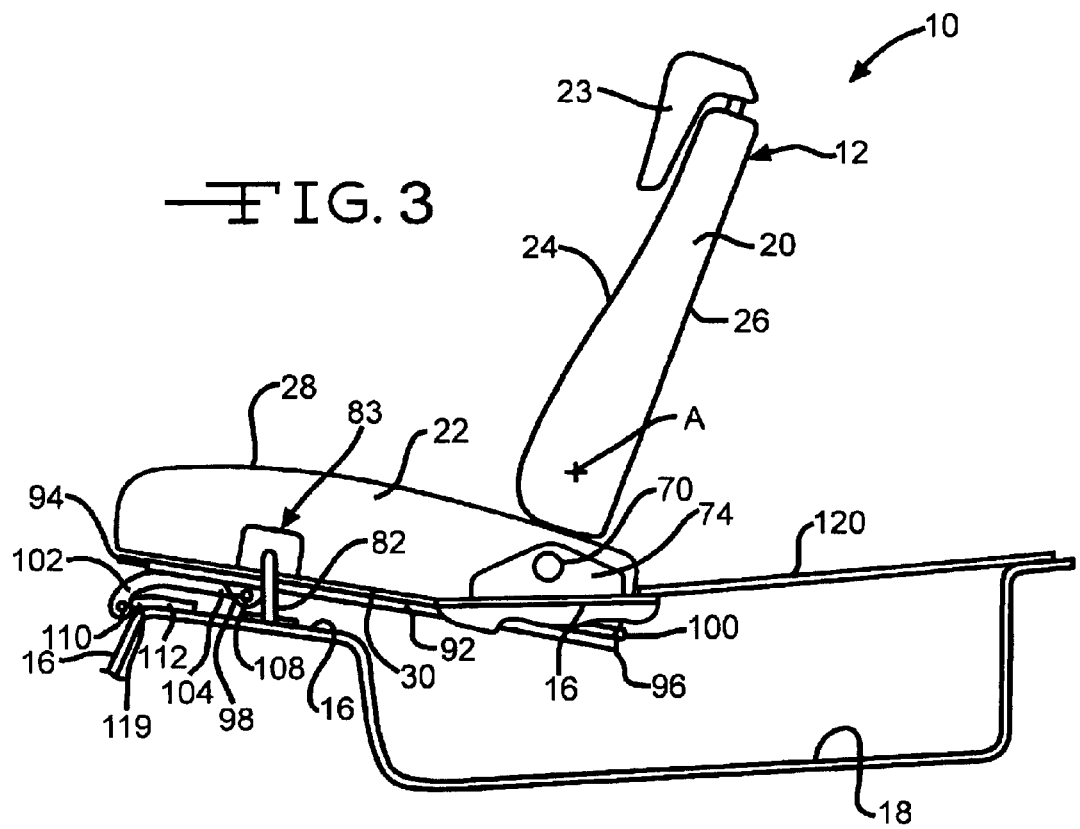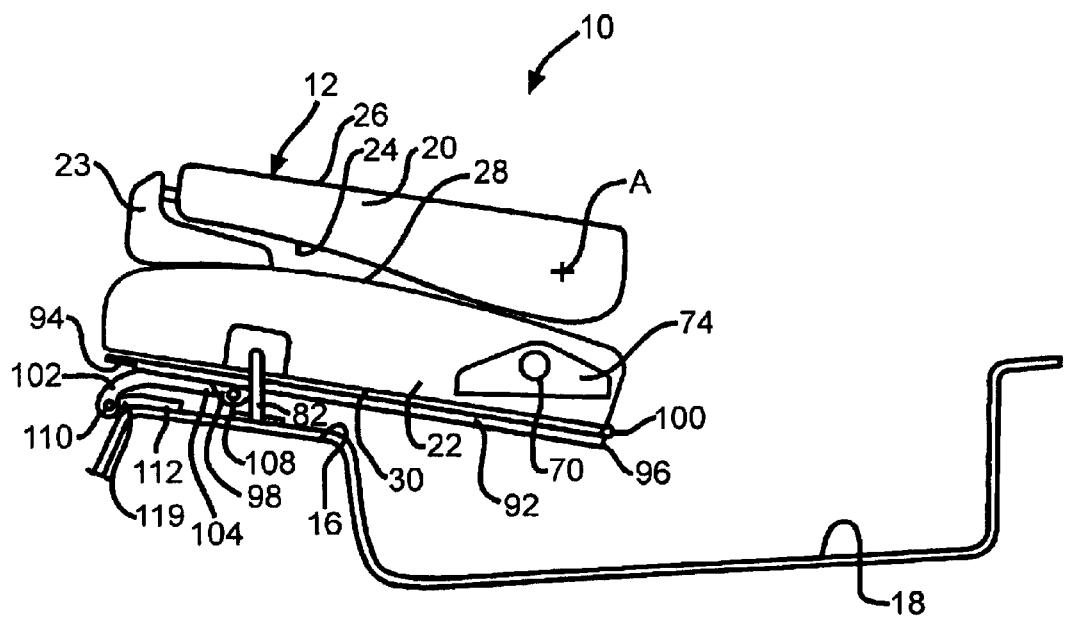

VEHICLE SEAT ASSEMBLY

BACKGROUND OF THE INVENTION

This invention relates in general to vehicle seats, and in particular to a vehicle seat arrangement in which a relatively flat horizontal support surface can be formed.

A typical four or more person passenger vehicle includes a pair of front seats and either a single relatively wide rear/second row seat or a pair of rear/second row seats. For larger vehicles such as vans and sport utility vehicles, a third row seat can be included. The third row seat is typically a single relative wide seat generally spanning the lateral width of the interior of the vehicle. The seat includes a seat back and a seat bottom.

In some vehicles, the seat backs of the second and third row of seats are pivotally connected to the seat bottom. The seat backs are movable between an upright position, for the seating of an occupant, and a collapsed position, wherein the seat back is pivoted forward to a position above the seat bottom. It is sometimes desirable to configure the seat back of the second row seat so that when the seat back is in its forward position a back surface of the seat back is generally horizontal. The back surface of the seat back can also be coplanar with the collapsed seat back of the third row seat. It is known to provide a panel which is manually movable to a position to bridge the gap of the second and third row seats so that a relatively flat horizontal support surface is formed.

It is also know to provide a third row seat which is pivotable to storage position within a recess formed in the vehicle floor for storing the third row seat. The seat bottom has a rear portion which is pivotally mounted on the vehicle floor. The seat bottom includes an upper surface and a lower surface. A seat back is pivotally mounted on the seat bottom, and is movable to a collapsed position onto the upper surface of the seat bottom. Once the seat back is moved to its collapsed position, the combination of the seat bottom and the seat back are pivotable about 180 degrees to their storage position within the recess formed in the floor of the vehicle.

BRIEF SUMMARY OF THE INVENTION

This invention relates to a vehicle seat assembly which includes an automatically deployed load floor. More specifically, the vehicle seat assembly mounts on a vehicle floor and includes a seat bottom pivotally mounted relative to the vehicle floor. The seat bottom defines an upper surface and an opposed lower surface. The seat bottom is movable between a seating position, wherein the upper surface faces upwards, and a storage position, wherein the lower surface faces upwards. A panel is pivotally connected to the seat bottom. The panel is automatically moved between a first position underneath the seat bottom when the seat bottom is in the seating position, and a generally horizontally deployed position when the seat bottom is moved to the storage position.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a schematical side elevational view of the seat assembly of FIG. 1 and cross-sectional view of the floor of the vehicle, wherein the seat assembly is shown in its seating position, and wherein a panel is shown in its concealed position.

FIG. 4 is a schematical side elevational view of the seat assembly of FIG. 1 and a cross-sectional view of the floor of the vehicle, wherein the seat back is shown in its lapsed position.

DETAILED DESCRIPTION OF THE INVENTION

Figure 1:
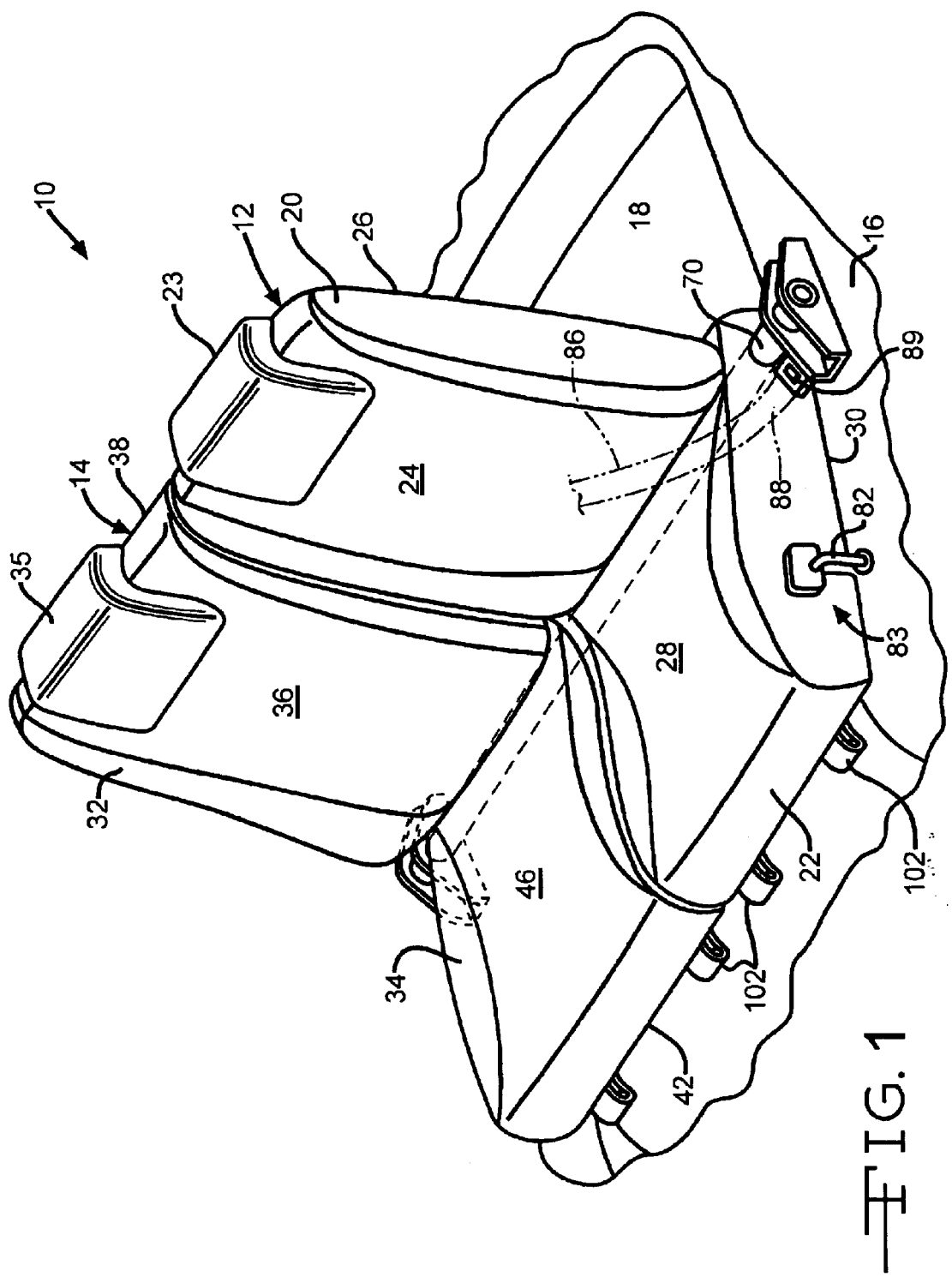
FIG. 1 is a perspective view of a seat assembly in accordance with the present invention, wherein the seat assembly is shown in its seating position.
Figure 5:
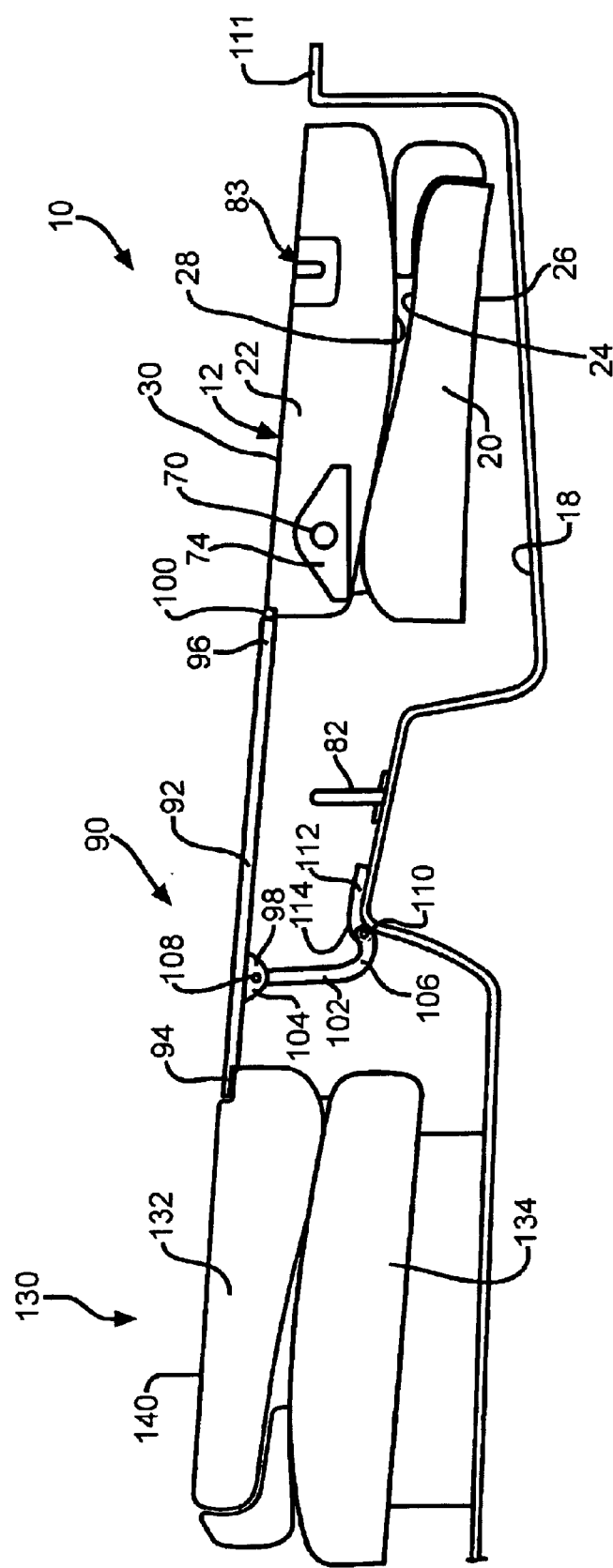
FIG. 5 is a schematical side elevational view of the seat assembly of FIG. 1 and a cross-sectional view of the floor of the vehicle, wherein the seat assembly is shown in its storage position, and wherein the panel is shown in its deployed position.

Referring now to the drawings, there is illustrated in FIG. 1 a vehicle seat assembly, indicated generally at 10. Although the seat assembly 10 could be configured as a single relatively wide seat which generally extends across the width of the interior of the vehicle, the seat assembly 10 preferably includes a pair of seats, indicated generally at 12 and 14. The seats 12 and 14 are positionable to a seating position, as shown in FIG. 1, such that they are positioned laterally adjacent one another. As will be discussed in more detail below, the seats 12 and 14 are pivotally mounted relative to a vehicle floor 16 and can be independently moved relative to one another to a storage position within a recess 18 formed in the floor, as shown in FIG. 5. Thus, one of the seats 12 and 14 can be used to seat an occupant, while the other seat can be moved to a storage position for accommodating cargo. Although the seat assembly 10 can be positioned at any suitable location within a vehicle, it is ideally suited as a last or third row seat in a vehicle having a total of three rows of seats.

The seat 12 includes a seat back 20 and a seat bottom 22. The seat back 20 may include a movably mounted headrest 23. The seat back 20 defines a front surface 24 and a rear surface 26. The front surface 24 can have any suitable contoured shape to accommodate the support and comfort of an occupant. The seat bottom 22 defines an upper surface 28 and a lower surface 30. The upper surface 28 can have any suitable contoured shape to accommodate the support and comfort of an occupant. Similarly, the seat 14 includes a seat back 32 and a seat bottom 34. The seat back 32 may include a movably mounted headrest 35. The seat back 32 defines a front surface 36 and a rear surface 38. The seat bottom 34 defines an upper surface 40 and a lower surface 42. The front surface 36 of the seat back 32 and the upper surface 40 of the seat bottom 34 can have any suitable contoured shape to accommodate the support and comfort of an occupant. The seats 12 and 14 are similar in structure and function and, therefore, only the seat 12 will be described in detail. Although the seats 12 and 14 are shown as having generally the same width, it should be understood that the seats 12 and 14 could have different widths, such as for example, wherein one seat is approximately 40 percent of the width of the seat assembly 10, and the other seat being approximately 60 percent of the width of the seat assembly. This width arrangement is commonly known as a 60/40 split seat arrangement such that a center portion of the seat is integral with only one of the seats 12 and 14.

The seat back 20 and the seat bottom 22 of the seat 12 are each formed from a structural framework, indicated generally at 50 and 52, respectively, and cushion members which define the surfaces 24 and 28. The cushion members can be made of any suitable material which provides a cushioned support for the occupant. For example, the cushion members can be made of one or more layers of foam material attached to the framework and having an outer trim cover material adhered thereto. Examples of suitable cover materials are cloth, leather, and vinyl. The cushion members completely surround the framework 50 and 52 in the areas of the seating surfaces 24 and 28. However, for the rear surface 26 of the seat back 20 and the lower surface 30 of the seat bottom 22, the framework 50 and 52 may be exposed, covered by the cushion members, or covered with another trim piece. Thus, the lower surface 30 of the seat bottom 22 need not be a flat planar surface, but can have a contoured shape.

Figure 2:
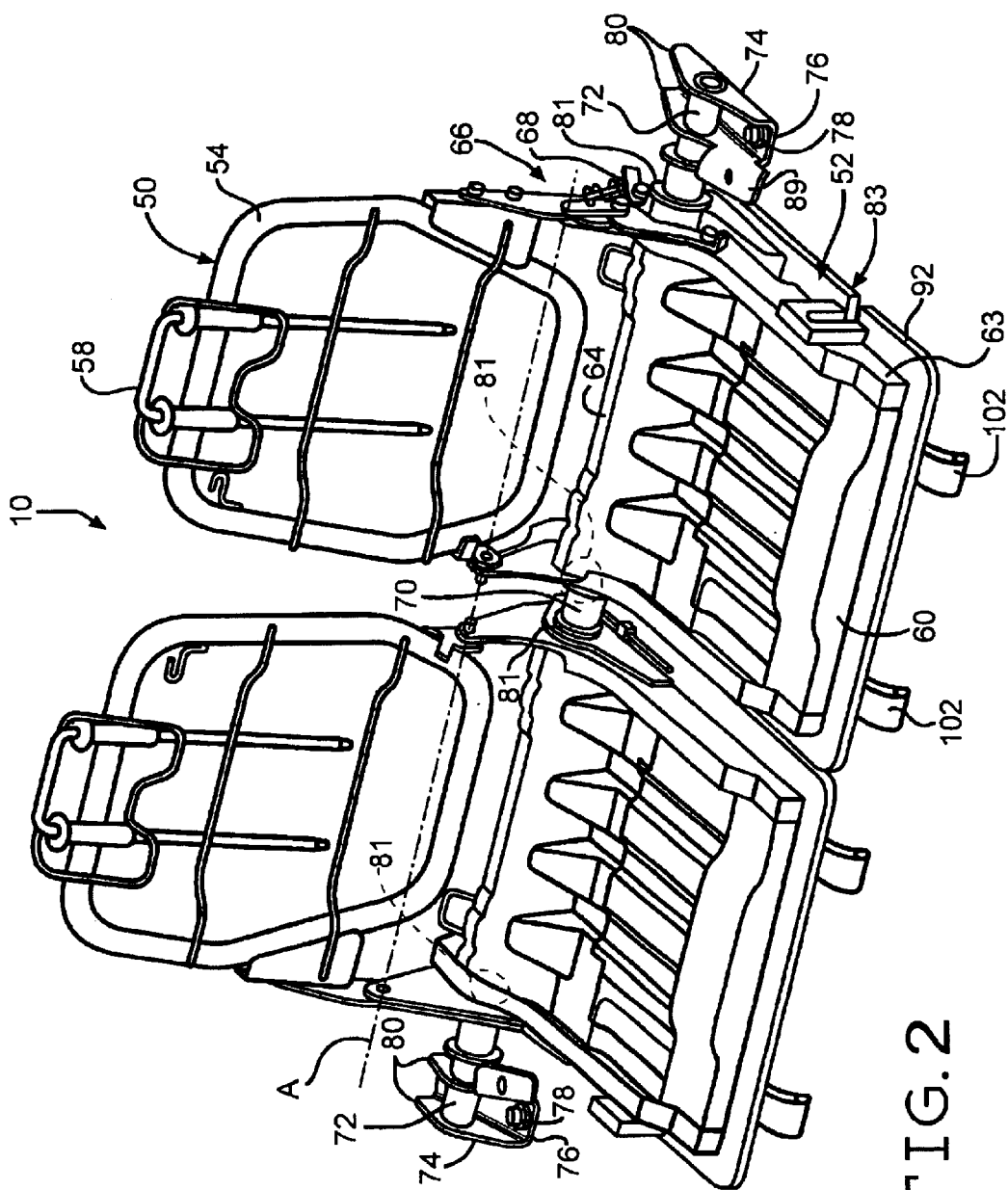
FIG. 2 is a perspective view of the framework of the seat assembly of FIG. 1.

The structural framework 50 and 52 can be made of any suitable material, such as metal, plastics, or composites which support an occupant of the seat assembly 10. In a preferred embodiment of a framework 50 of the seat back 20, as shown in FIG. 2, a closed loop tubular member 54 generally defines the shape of the seat back 20. A headrest framework 58 can be mounted on the tubular member 54 for movably mounting the headrest 23 to the seat back 20. The framework 52 of the seat bottom 22 generally includes a pan 60 and a pair of side bars 62 attached to an upper surface of the pan 60. The pan 60 includes a raised rear portion 64. The framework 50 of the seat back 20 is pivotally attached to framework 52 of the seat bottom 22 about a pivot axis A. Preferably, the seat assembly 10 includes a latch mechanism, indicated generally at 66, for releasably securing the seat back 20 to its seating position relative to the seat bottom 22, as shown in FIGS. 1 and 3. The latch mechanism 66 can be any suitable conventional latch mechanism. For example, the latch mechanism 66 can include a spring biased lever arm 68 which is manually moved to an unlatched position against the bias of a spring. Alternatively, the latch mechanism 66 can include a cable (not shown) attached to the lever arm 68 which is manually pulled or urged by another lever arm. Preferably, the manual input member of the latch mechanism 66 is positioned on the outboard side of the seat 12. Of course, the latch mechanism 66 could also be operated by an electrical device, such as a solenoid switch.

The latch mechanism 66 could also be configured to releasably attach the seat back 20 from the seat bottom 22. An advantage of this configuration is that if the recess 18 could not be formed having a depth to accommodate both the seat back 20 and the seat bottom 22, the seat 12 could still be easily stored by first removing the seat back 20 and then moving the seat bottom 22 into its storage position within the recess 18, as described below.

The frameworks of the seat bottoms 22 and 34 of the seats 12 and 14, respectively, are preferably pivotally attached relative to the vehicle floor 16 by a cross bar 70 extending laterally across the width of the vehicle. In a preferred embodiment, the cross bar 70 has a cylindrical tubular cross-section and extends through both of the seats 12 and 14 such that the width of the cross bar 70 is wider than the widths of the seat bottoms 22 and 34. Thus, the cross bar 70 has ends 72 which extend beyond the outboard sides of the seats 12 and 14. In a further preferred embodiment, the cross bar 70 extends through the outboard side of the cushion members of the seat bottoms 22 and 34, as shown in FIG. 1, thereby generally concealing the central portion of the cross bar 70. As shown in FIG. 2, the cross bar 70 is positioned underneath the raised rear portion 64 of the seat pan 60.

The ends 72 of the cross bar 70 are mounted on the vehicle floor or frame of the vehicle by brackets 74. If desired, the center portion of the cross bar 70 could also be mounted on the vehicle floor by a bracket (not shown). The brackets 70 include a lower plate 76 attached to the floor 16 by threaded fasteners 78. A pair of triangular flanges 80 extend upwards from the plate 76 and include apertures for receiving the cross bar 70. Preferably, the cross bar 70 is rotationally fixed relative to the brackets 70 such as by a weld.

The framework 52 of the seat bottom 22 can be pivotally attached to the cross bar 70 by any suitable manner. For example, pairs of spaced apart bushings or bearing assemblies, indicated generally at 81, could be installed onto the side bars 62. Preferably, the framework 52 of the seat bottom 22 is pivotally mounted on the cross bar 70 at two distinct locations, such as at the lateral sides of the framework 52. This mounting arrangement would provide additional support for the seat 12 such as when subjected to lateral loads acting on the seat back 20 or about the center of gravity of the seat assembly 10. The seat 12 could also be configured such that the seat bottom 22 was releasably attached to the cross bar 70 for removal of the seat 12. To accomplish this, the bushing or bearing assemblies 81 could be configured to open and release from the cross bar 70. In another alternate embodiment, the pan 60 or other members of the framework 52 could be directly attached to the cross bar 70, wherein the cross bar 70 is mounted for rotational movement on the brackets 72. Although a single cross bar 70 is shown and described for pivotally attaching both seats 12 and 14, it should be understood that each seat 12 and 14 could be pivotally attached to the vehicle floor 16 by a separate cross bar.

Since the seat bottoms 22 and 34 of the seats 12 and 14 are pivotable relative to the vehicle floor 16, each seat 12 and 14 preferably includes a latch assembly, indicated generally at 83 as shown in FIG. 1, for releasably securing the seat bottoms 22 and 34 relative to the vehicle floor 16 and maintain the seats 12 and 14 into their seating positions. The latch assembly 83 can be any suitable conventional latch mechanism. For example, the latch assembly 83 can include a loop portion 82 attached to the vehicle floor 16 and extending upwards therefrom. A hook portion (not shown) is pivotally attached to the seat bottom 22 and is movable between an engaged and disengaged position with the loop portion 82. The hook portion can be moved by any conventional manner, such as by a lever arm or a cable.

Since the seat 12 is rotatable about the cross bar 70, the cross bar 70 provides structural support for the seat 12 and generally secures the seat 12 to the vehicle floor 16 or a frame member. Most loads, such as a forward, rearward, and/or upward directional forces acting on the seat 12 are transmitted to the vehicle floor 16 via the cross bar 70 and brackets 72. A downwardly acting force, such as caused by the weight of the seat 12 and the occupant is supported by the cross bar 70 and either the latch assembly 83 or a panel assembly 90, as will be described below. Thus, it is desirable to manufacture the cross bar 70 to withstand relatively high forces. Preferably, the cross bar 70 is made of metal, but of course can be made of any suitable material. Since the cross bar 70 and brackets 72 are designed to withstand high loads, a safety restraint strap 86 or may be attached to the cross bar 70 or brackets 72. As shown in FIG. 1, an end 87 of the restraint strap 86 can be operatively attached to the cross bar 70 by a bracket 89 attached to the bracket 72. The other end of the strap 86 can be attached to the cross bar 70 or attached to another portion of the vehicle. The advantage of attaching the restraint strap 86 to the cross bar 70 is that forces acting on said restraint strap 86 by the occupant from deceleration of the vehicle is transmitted through the restraint and onto the cross bar. Thus, the cross bar 70 provides a convenient mounting location for the restraint strap 86. Any suitable conventional restraint strap can be used.

Each of the seats 12 and 14 preferably includes an optional panel assembly, indicated generally at 90. The panel assembly 90 includes a generally rectangular flat panel 92 which is movable from a concealed position underneath the seat bottom 22, as shown in FIG. 3, to a deployed generally horizontal position, as shown in FIG. 5, to provide a relatively flat load floor in cooperation with the lower surface 30 of the seat bottom 22.

Although the panel 92 can have any suitable shape, preferably the panel 92 is generally rectangular and has a lateral width approximately equal to the lateral width of the seat bottom 22. Preferably, the width of the panels of the seats 12 and 14 are such that their adjacent edges are sufficiently close to one another in their deployed position, such that they form a continuous lateral flat load floor.

The panel 92 defines a front edge 94 and a rear edge 96. A pair of spaced apart brackets 98 extends downwardly from the panel 92 at a location intermediate the front and rear edges 94 and 96. The rear edge 96 of the panel 92 is pivotally connected to a rear edge 100 of the seat bottom 22. The seat assembly 10 further includes a pair of J-shaped legs 102 having a first end 104 and a second end 106. The first ends 104 of the legs 102 are pivotally connected to a respective one of the brackets 98 at pivots 108 defining a first laterally extending axis. The second ends 106 of the legs 102 are pivotally connected relative to the vehicle floor at pivots 110 defining a second laterally extending axis. Preferably, a pair of flanges 112 are attached to the vehicle floor 16. The flange 112 includes a curved end 114 having a complimentary shape at the J-shaped legs 102. The second ends 106 of the legs 102 are pivotally connected to the curved ends 114 of the flanges 112. As best shown in FIG. 3, the first laterally extending axis is positioned slightly higher and forward relative to the second laterally extending axis.

The pair of legs 102 are laterally spaced apart from each other to provide lateral support for the panel 92. The legs 102 also provide vertical support for the seat bottom 22 when the panel 92 is in its concealed position underneath the seat bottom 22. In particular, the leg 102 on the inboard side of the seat 12 may provide the sole support for the inboard side of the seat 12, thereby eliminating the need for a separate leg or stop. The latch assembly 83 may provide additional support for the outboard side of the seat 12.

Instead of using a pair of spaced apart legs 102, the panel assembly 90 could include a single leg pivotally attached to the vehicle floor at a central location relative to the width of the seat bottom 22. To provide lateral support for the inboard and outboard sides of the panel 92 and the seat 12, the single leg could have a generally triangular or T-shaped configuration, wherein the T-shaped leg defines an upper vertical member having ends spaced apart from one another. The ends could be pivotally connected to the pair of spaced apart brackets 98 mounted on the panel 92. The T-shaped or triangular leg would define a lower portion which is pivotally connected to the floor 16 at a central location relative to the width of the seat bottom. Thus, a single leg could be provided which still provides support for both the inboard and outboard side of the panel 92.

The operation of the seat assembly will now be described. As stated before, the seat 14 is similar to the seat 12, and therefore only the operation of the seat 12 will be described. It should be understood that the seat 12 can be moved independently of the set 14.

As stated above, the seat 12 is movable between a seating position, as shown in FIGS. 1 and 3, and a storage position, as shown in FIG. 5. In the seating position, the seat back 20 is in a generally vertical orientation, and the seat bottom 22 is in a generally horizontally position to provide support for an occupant seating on the seat 12. Of course, as can be seen in FIGS. 1 and 3, the seat back and seat bottom of the seat 12 are not exactly vertical and horizontal but at a slight angle to accommodate the posture of the occupant. Thus, the terms "vertical" and "horizontal" as used herein should not be interpreted to be exact or precisely oriented so.

To move the seat 12 from its seating position to its storage position, the latch mechanism 66 is operated to pivotally unlatch the seat back 20 from the seat bottom 22. The seat back 20 can then by manually moved to a collapsed position on top of the seat bottom 22, as shown in FIG. 4. In the collapsed position, the front surface 24 of the seat back 20 faces downwards and is preferably adjacent the upper surface 28 of the seat bottom 22. The rear surface 26 of the seat back faces upwards. The seat 12 could also include a spring member (not shown) for biasing the seat back 22 to its collapsed position, so that the upon operation of the latch mechanism 66, the seat back 20 automatically moves to its collapsed position.

Next, the latch assembly 83 is operated to pivotally unlatch the combination of the seat bottom 22 and the seat back 20 relative to the vehicle floor. The combination of the seat bottom 22 and the seat back 20 are then rotated about the cross bar 70 approximately 180 degrees to place the combination of the seat bottom 22 and the seat back 20 within the recess 18 of the floor 16. Note that the combination of the seat bottom 22 and the seat back 20 do not have to be entirely disposed in the recess. In the storage position, the lower surface 30 of the seat bottom 22 faces upwards. Preferably, the lower surface of the seat bottom 22 is substantially flush with a portion 111 of the floor 16, such as the rear and side edges adjacent the seat bottom 22. The seat 12 may further include a latch (not shown) for releasably securing the seat bottom 22 in its storage position.

As shown in FIG. 3, the seat assembly 10 may include one or a pair of covers 120 to cover the recess 18 of the floor when the seats 12 and/or 14 are in their seating positions. Since the seats 12 and 14 are independently movable, preferably the seat assembly 10 includes two covers, one for each side of the recess 18 corresponding to the seats 12 and 14. Thus, when only one of the seats 12 and 14 is in its seating position, a cover can be used to cover the recess 18. The recess 18 can be formed as a single recess extending across the width of the vehicle, wherein the recess is wide enough to receive both seats 12 and 14 in their storage positions. Alternatively, the recess 18 may be formed as two separate recess, each one corresponding to and positioned on the vehicle floor 16 to receive a respective seat 12 and 14.

When the seat 12 is moved to its storage position from its seating position, the panel 92 is automatically deployed from its concealed position, as shown in FIGS. 3 and 4, to its deployed position, as shown in FIG. 5, by the linkage pivoting linkage formed by the first and second axis of the legs 102. The term "automatically" as used herein when referring to movement of the panel 92 essentially means that a mechanical connection between the panel 92 and the seat 12 provides the movement of the panel 92 during movement of the seat 12, as opposed to movement of the panel 92 by an electrical mechanism or by manually manipulation. The shape of the legs 102 and the positions of the first and second laterally extending axis defined by the pivots 108 and 110 allows the path of the panel 92 to be controlled as it is deployed so as to avoid interference with other components of the vehicle.

When the panel 92 is in its deployed position, the panel 92 is at a generally horizontal orientation. The panel 92 in cooperation with the lower surface 30 of the seat bottom 22, provides a continuous longitudinally extending horizontal load floor extending from the edge 94 of the panel 92 to the front edge of the seat bottom 22. Preferably, the upper surface of the panel 92 is generally co-planar with the lower surface 30 of the seat bottom 22 when the seat bottom 22 is in its storage position. Of course, the panel 92 and the lower surface 30 of the seat bottom 22 do not have to be exactly horizontal but may be angled relative to the horizon by less than 20 degrees and more preferably less than 10 degrees.

As shown in FIG. 5, the panel 92 is preferably sized so that the front edge 94 of the panel 92 abuts or is adjacent a front seat 130 installed in the vehicle in front of the seat assembly 10. The front seat 130 may be a second row seat if the seat assembly 10 is used a third row seat. The front seat 130 includes a seat back 132 and a seat bottom 134. Preferably, the seat back 132 is movable to a collapsed position above the seat bottom 134. A rear surface 140 of the seat back 132 may also be co-planar with the panel 92 and the lower surface 30 of the seat bottom 22, as shown in FIG. 5, to provide an continuous generally horizontal load floor. Thus, the panel 92 bridges the gap between the seat 130 and the seat 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly for mounting on a vehicle floor comprising:
   a seat bottom adapted to be pivotally mounted relative to a vehicle floor, said seat bottom defining an upper surface and an opposed lower surface, wherein said seat bottom is movable between a seating position wherein said upper surface faces upwards, and a storage position wherein said lower surface faces upwards; and
   a panel pivotally connected to said seat bottom, wherein said panel is automatically moved between a first position underneath said seat bottom when said seat bottom is in said seating position, and a generally horizontally deployed position when said seat bottom is moved to said storage position.

2. The seat assembly of claim 1, wherein said seat bottom has a rear portion adapted to be pivotally mounted relative to a vehicle floor.

3. The seat assembly of claim 1, further including a leg having first and second ends, said first end pivotally connected to a portion of said panel, and said second end adapted to be pivotally mounted on the floor.

4. The seat assembly of claim 3, wherein said second end of said leg is adapted to be pivotally mounted on the floor at a second axis which is positioned underneath said first axis.

5. The seat assembly of claim 3, wherein said leg defines a first leg having a first end pivotally connected to a first portion of said panel, and wherein said seat assembly includes a second leg having first and second ends, said first end of said second leg pivotally connected to a second portion of said panel which is positioned laterally relative to said first position, and said second leg adapted to be pivotally mounted on the floor.

6. The seat assembly of claim 5, wherein at least one of said first and second legs provides structural support for an inboard side of said seat bottom when said seat bottom is in said seating position.

7. The seat assembly of claim 6, further including a latch for releasably securing said seat bottom in said storage position, wherein said latch provides structural support for an outboard side of said seat bottom when said seat bottom is in said seating position.

8. The seat assembly of claim 1, further including a seat back pivotally mounted relative to said seat bottom, wherein said seat back defines a front surface and is movable relative to said seat bottom to a collapsed position such that said front surface of said seat back is adjacent said upper surface of said seat bottom, wherein said combination of said seat bottom and said seat back are pivotable to a storage position such that said lower surface of said seat bottom faces upwards and said seat back is positioned underneath said seat bottom.

9. The seat assembly of claim 1, wherein said panel is generally co-planar with said lower surface of said seat bottom when said panel is in said deployed position.

10. The seat assembly of claim 1, wherein said panel is adjacent said lower surface of said seat bottom when said panel is in said first position.

11. The seat assembly of claim 10, wherein said panel is flush against said lower surface of said seat bottom when said panel is in said first position.

12. The seat assembly of claim 1, wherein said seat bottom defines front and rear edges, and said panel is pivotally connected adjacent said rear edge of said seat bottom.

13. A vehicle seat assembly for mounting on a vehicle floor comprising:
   a seat bottom having a rear portion adapted to be pivotally mounted relative to a vehicle floor, said seat bottom having an upper surface and a lower surface;
   a seat back pivotally mounted relative to said seat bottom, wherein said seat back has a front surface and is movable relative to said seat bottom to a collapsed position such that said front surface of said seat back is adjacent said upper surface of said seat bottom, wherein said combination of said seat bottom and said seat back are pivotable to a storage position such that said lower surface of said seat bottom faces upwards; and
   a panel pivotally connected to said seat bottom, wherein said panel is movable between a first position underneath said seat bottom when said seat bottom is in said seating position, and a generally horizontally deployed position when said seat bottom is in said storage position such that said panel is generally co-planar with said lower surface of said seat bottom.

14. A vehicle interior assembly comprising:
   a front seat having a front seat bottom and a front seat back defining a rear surface, said front seat movable to a collapsed position such that said front seat back is above said front seat bottom, and wherein said rear surface of said front seat back faces upwards in a generally horizontal position;
   a rear seat having a rear seat back and a rear seat bottom, said rear seat having a rear seat bottom adapted to be pivotally mounted relative to a vehicle floor, said rear seat bottom defining an upper surface and an opposed lower surface, wherein said rear seat bottom is movable between a seating position wherein said upper surface faces upwards, and a storage position wherein said lower surface faces upwards, and wherein a gap exists between said front seat back, when in said collapsed position, and said rear seat bottom, when in said storage position; and a panel pivotally connected to said seat bottom, wherein said panel is automatically moved between a first position and a deployed position to bridge said gap.

15. The vehicle interior assembly of claim 14 further including a leg having first and second ends, said first end pivotally connected to a portion of said panel, and said second end adapted to be pivotally mounted on the floor.

16. The vehicle interior assembly of claim 14, wherein said seat back is pivotally mounted relative to said seat bottom, wherein said seat back defines a front surface and is movable relative to said seat bottom to a collapsed position such that said front surface of said seat back is adjacent said upper surface of said seat bottom, wherein said combination of said seat bottom and said seat back are pivotable to a storage position such that said lower surface of said seat bottom faces upwards and said seat back is positioned underneath said seat bottom.

17. The vehicle interior of claim 14, wherein said rear surface of said front seat back, said panel, and said lower surface of said rear seat bottom form a generally horizontal coplanar support surface when said front seat back is in said collapsed position, said panel is in said deployed position, and said rear seat bottom is in said storage position.

18. The vehicle seat assembly of claim 13, wherein said panel is pivotally connected to said seat bottom such that said panel is automatically moved to said deployed position from said first position upon moving said seat bottom to said storage position.

19. The vehicle seat assembly of claim 13 further including a leg having first and second ends, said first end pivotally connected to a portion of said panel, and said second end adapted to be pivotally mounted on the floor.

20. The vehicle seat assembly of claim 13, wherein said seat bottom defines front and rear edges, and said panel is pivotally connected adjacent said rear edge of said seat bottom.

\* \* \* \* \*